(12) United States Patent
Ishiko et al.

(10) Patent No.: US 11,219,947 B2
(45) Date of Patent: Jan. 11, 2022

(54) FINE METAL PARTICLES, DISPERSION SOLUTION CONTAINING FINE METAL PARTICLES, AND PROCESS FOR THE PRODUCTION THEREOF

(71) Applicant: TOYO SEIKAN GROUP HOLDINGS, LTD., Tokyo (JP)

(72) Inventors: Akira Ishiko, Osaka (JP); Hiroshi Shimomura, Osaka (JP); Kazuaki Ohashi, Yokohama (JP); Yasuhiro Kosaka, Yokohama (JP); Akiko Koganei, Yokohama (JP)

(73) Assignee: TOYO SEIKAN GROUP HOLDINGS, LTD., Tokyo (JP)

( * ) Notice: Subject to any disclaimer, the term of this patent is extended or adjusted under 35 U.S.C. 154(b) by 0 days.

(21) Appl. No.: 16/467,740

(22) PCT Filed: Dec. 15, 2017

(86) PCT No.: PCT/JP2017/045102
§ 371 (c)(1),
(2) Date: Jun. 7, 2019

(87) PCT Pub. No.: WO2018/116980
PCT Pub. Date: Jun. 28, 2018

(65) Prior Publication Data
US 2020/0070243 A1 Mar. 5, 2020

(30) Foreign Application Priority Data
Dec. 20, 2016 (JP) .............................. JP2016-246577

(51) Int. Cl.
*B22F 1/00* (2006.01)
*A01N 59/20* (2006.01)

(52) U.S. Cl.
CPC ............ *B22F 1/0077* (2013.01); *A01N 59/20* (2013.01); *B22F 2301/10* (2013.01); *B22F 2301/255* (2013.01); *B22F 2301/30* (2013.01)

(58) Field of Classification Search
CPC ................ B22F 1/0077; B22F 2301/10; B22F 2301/255; B22F 2301/30; A01N 59/20
(Continued)

(56) References Cited

U.S. PATENT DOCUMENTS

2011/0155432 A1 6/2011 Tomonari et al.
2011/0313089 A1* 12/2011 Fischer .................... C09D 7/45
524/315
(Continued)

FOREIGN PATENT DOCUMENTS

EP 2 474 583 A1 7/2012
EP 3 072 931 A1 9/2016
(Continued)

OTHER PUBLICATIONS

TW201605737A with translation (ip.com) (Year: 2016).*
(Continued)

*Primary Examiner* — Anthony J Zimmer
*Assistant Examiner* — Ricardo D Morales
(74) *Attorney, Agent, or Firm* — Sughrue Mion, PLLC

(57) ABSTRACT

Fine metal particles of any one of Ag, Cu or Zn having a dispersing agent that is coordinated on the surfaces thereof, the dispersing agent having an acid value and an amine value which are both in a range of 0 to 20 mgKOH/g (wherein when either the acid value or the amine value is 0, the other one is not 0), and a dispersion solution in which the fine metal particles are dispersed. The fine metal particles and the dispersion solution containing the fine metal particles can be diluted with various kinds of solvents of either the water
(Continued)

type or the organic type, and feature excellent dispersion property even after having been diluted.

5 Claims, 1 Drawing Sheet

(58) Field of Classification Search
  USPC .......................................................... 75/255
  See application file for complete search history.

(56) References Cited

U.S. PATENT DOCUMENTS

| | | | |
|---|---|---|---|
| 2012/0037041 A1 | 2/2012 | Nolte et al. | |
| 2016/0255841 A1 | 9/2016 | Ohashi et al. | |
| 2017/0120394 A1* | 5/2017 | Shingai | ................ B22F 1/0062 |

FOREIGN PATENT DOCUMENTS

| | | | | | |
|---|---|---|---|---|---|
| JP | 08-311373 | A | | 11/1996 | |
| JP | 11-080647 | A | | 3/1999 | |
| JP | 2008-508321 | A | | 3/2008 | |
| JP | 2009-227736 | A | | 10/2009 | |
| JP | 2009227736 | A | * | 10/2009 | |
| JP | 2010-202943 | A | | 9/2010 | |
| JP | 2012-511627 | A | | 5/2012 | |
| JP | 2013-241643 | A | | 12/2013 | |
| JP | 2014-055332 | A | | 3/2014 | |
| JP | 2015-086435 | A | | 5/2015 | |
| JP | 201586435 | A | * | 5/2015 | ................ B22F 9/00 |
| JP | 2015086435 | A | * | 5/2015 | ................ B22F 9/24 |
| TW | 201605737 | A | * | 2/2016 | ................ C01G 5/00 |
| WO | 2006/026026 | A2 | | 3/2006 | |
| WO | 2011/007650 | A1 | | 1/2011 | |
| WO | 2011/024969 | A1 | | 3/2011 | |
| WO | 2015/064700 | A1 | | 5/2015 | |

OTHER PUBLICATIONS

JP201586435Awith translation (ip.com) (Year: 2015).*
BYK Disperbyk-190 Data Sheet (Year: 2012).*
Byk (DISPERBYK-2013 Data Sheet, Jun. 2013) (Year: 2013).*
JP2009227736A English translation (Year: 2009).*
International Search Report of PCT/JP2017/045102 dated Mar. 6, 2018 [PCT/ISA/210].
Extended European Search Report dated Mar. 30, 2020 in corresponding European Application No. 17883428.9.
Communication dated Nov. 17, 2020 from the Japanese Patent Office in Application No. 2016-246577.
Communication dated Mar. 23, 2021 by the Korean Patent Office in application No. 10-2019-7020738.

* cited by examiner

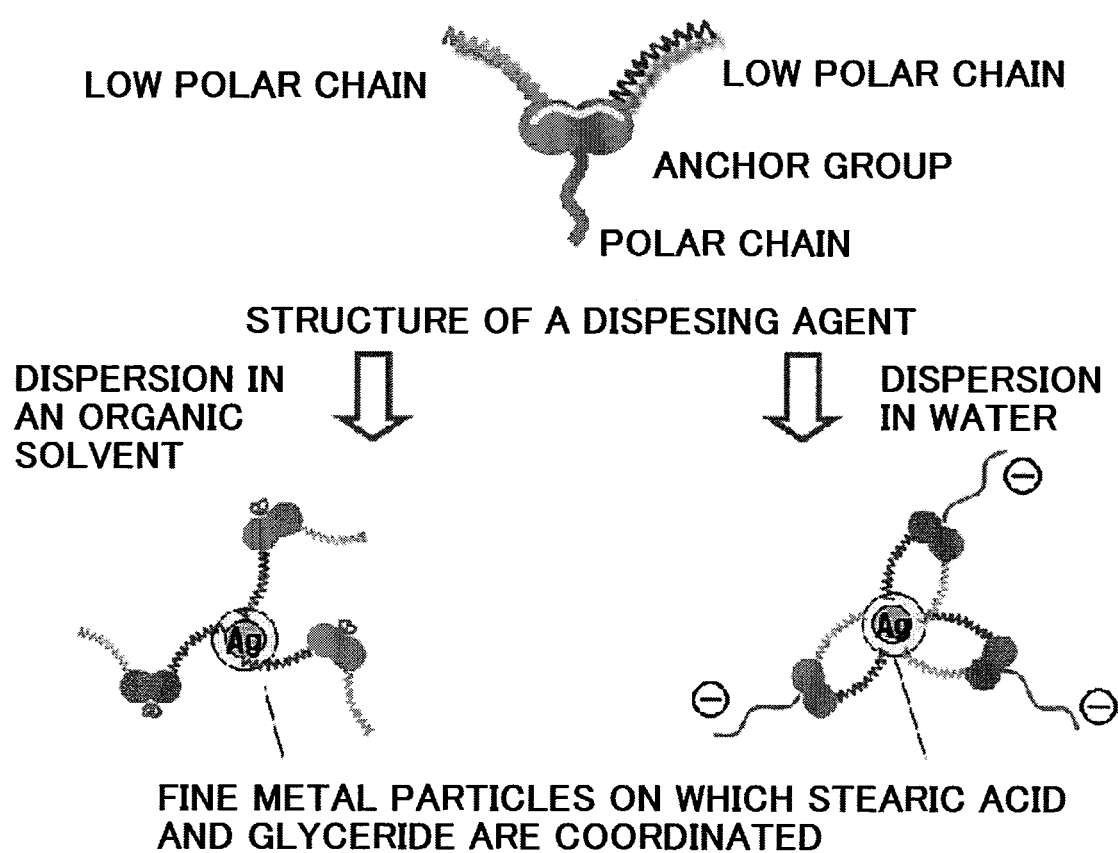

FINE METAL PARTICLES, DISPERSION SOLUTION CONTAINING FINE METAL PARTICLES, AND PROCESS FOR THE PRODUCTION THEREOF

CROSS REFERENCE TO RELATED APPLICATIONS

This application is a National Stage of International Application No. PCT/JP2017/045102, filed Dec. 15, 2017, claiming priority to Japanese Patent Application No. 2016-246577, filed Dec. 20, 2016.

TECHNICAL FIELD

This invention relates to fine metal particles, to a dispersion solution in which the fine metal particles are dispersed and to a process for the production thereof. More specifically, the invention relates to fine metal particles which can be homogeneously dispersed in various kinds of solvents without being aggregated or precipitated to impart excellent antibacterial power to various materials, to a dispersion solution containing the fine metal particles and to a process for the production thereof.

BACKGROUND ART

In recent years, it has been desired to impart antibacterial power not only to the products such as medical supplies and containers used under high-temperature and high-humidity conditions like in the kitchen, bathroom, washroom, etc., where bacteria and molds tend to easily propagate but also to the articles used in public places, such as straps and the like, materials related to dwelling, such as wall papers and building materials, filters such as of air conditioners, and various other products such as stationeries. Therefore, a variety of antibacterial compositions have been proposed to meet the demand.

The antibacterial compositions have been provided in a variety of forms such as a formed body obtained by containing an antibacterial agent in a thermoplastic resin or a thermosetting resin, a film obtained by containing an antibacterial agent in a coating material, and a dispersion solution obtained by dispersing an antibacterial agent in a solvent.

For instance, a patent document 1 listed below is describing a composition that contains a solvent, silver nanoparticles and a stabilizer. Though the composition is a dispersion solution obtained by dispersing the silver nanoparticles in a solvent, it is difficult to disperse the silver nanoparticles without permitting them to be aggregated. Therefore, a stabilizer is necessary to prevent the aggregation. However, the above composition is not still satisfactory from the standpoint of transparency and efficient use of silver.

A patent document 2 listed below describes a photocurable composition for antibacterial coating comprising a photocurable acrylic resin that contains a silver salt, and a patent document 3 listed below proposes a resinous formed body such as a protector board for use with various display devices, the resinous formed body comprising a photocurable resin that contains an antibacterial agent and/or an anti-molding agent so as to produce antibacterial power.

In a resin composition obtained by blending a photocurable acrylic resin with a silver salt like the resin compositions of the patent documents 2 and 3, it is difficult to efficiently and homogeneously disperse the silver salt in the acrylic resin, and it is not possible to obtain a resin composition satisfying both the requirements of antibacterial power and economy. It has, therefore, been desired to contain fine silver particles capable of exhibiting excellent antibacterial power in the resin composition without permitting them to be aggregated.

Under such circumstances, the present inventors have proposed a transparent fine silver particle-containing dispersion solution containing fine silver particles formed of a fatty acid silver and saccharin, and a method of producing the same (patent documents 4 and 5). According to this method, fine silver particles having excellent antibacterial power can be dispersed, by a relatively simple operation, in a low-boiling solvent that can be preferably used to impart antibacterial power to the resin compositions without permitting the fine particles to be aggregated in the low-boiling solvent. Further, the method efficiently removes by-products that affect the transparency of the dispersion solution. The obtained solution contains the fine silver particles in a homogeneously dispersed state without permitting them to be aggregated, and exhibits excellent antibacterial power as well as excellent transparency. According to the production method described in a patent document 5, furthermore, excellent dispersion property can be still maintained even after the passage of extended periods of time. Besides, excellent transparency can be realized even when mixed with a coating composition or a resin composition.

PRIOR ART DOCUMENTS

Patent Documents

Patent document 1: JP-T-2008-508321
Patent document 2: JP-A-H8-311373
Patent document 3: International Publication WO2011/007650
Patent document 4: JP-A-2013-241643
Patent document 5: JP-A-2015-86435

OUTLINE OF THE INVENTION

Problems that the Invention is to Solve

However, the dispersion solutions containing the fine metal particles obtained by the above-mentioned methods are not still fully satisfactory from the standpoint of yields of the fine metal particles. Therefore, it has been desired to have the fine metal particles contained in the dispersion solution in higher yields. Further, when the dispersion solutions containing the fine metal particles obtained by the above-mentioned methods are used as solvents for diluting the coating compositions, the stability of dispersion of the fine metal particles often decreases with an increase in the concentration of the fine metal particles. It has, therefore, been desired to realize the dispersion stability so that the dispersion solution can be used containing the fine metal particles at any concentration. Moreover, in the dispersion solutions containing the fine metal particles obtained by the above-mentioned methods, the solvent in which the fine metal particles can be dispersed is limited to a specific low-boiling solvent such as methylisobutyl ketone or the like, posing a limitation on their use. Therefore, it has been desired to provide the dispersion solutions containing the fine metal particles by dispersing the fine metal particles in various kinds of solvents.

It is, therefore, an object of the present invention is to provide fine metal particles that can be diluted with various kinds of solvents and that have excellent dispersion property even after having been diluted.

Another object of the present invention is to provide a dispersion solution containing fine metal particles obtained by homogeneously dispersing the fine metal particles in various kinds of solvents without permitting the fine metal particles to be aggregated or precipitated.

A further object of the present invention is to provide a process for producing a dispersion solution containing fine metal particles, the process being capable of forming and dispersing the fine metal particles in good yields.

Means for Solving the Problems

According to the present invention, there are provided fine metal particles of any one of Ag, Cu or Zn having a dispersing agent that is coordinated on the surfaces thereof, the dispersing agent having an acid value and an amine value which are both in a range of 0 to 20 mgKOH/g (wherein when either the acid value or the amine value is 0, the other one is not 0).

According to the present invention, further, there is provided a dispersion solution containing fine metal particles of any one of Ag, Cu or Zn having a dispersing agent coordinated on the surfaces thereof, the dispersing agent having an acid value and an amine value which are in a range of 0 to 20 mgKOH/g (wherein when either the acid value or the amine value is 0, the other one is not 0).

In the dispersion solution containing the fine metal particles of the present invention, it is desired that the solvent is a solvent that is capable of forming two separate phases with a glycerin.

According to the present invention, furthermore, there is provided a process for producing a dispersion solution containing fine metal particles, comprising the steps of:

preparing a glycerin in which the fine metal particles are dispersed, the fine metal particles having a fatty acid and a glyceride that are coordinated on the surfaces thereof, by adding a fatty acid metal salt to the glycerin followed by heating and mixing;

preparing a mixed solution containing the fine metal particles having the fatty acid, the glyceride and a dispersing agent that are coordinated on the surfaces thereof, by adding and mixing, into the glycerin in which the fine metal particles are dispersed, the dispersing agent and a solvent that is capable of forming two separate phases with the glycerin, the dispersing agent having an acid value and an amine value which are in a range of 0 to 20 mgKOH/g (wherein when either the acid value or the amine value is 0, the other one is not 0); and extracting the fine metal particles from the glycerin into the solvent by separating the mixed solution into two phases, the fine metal particles having the fatty acid, the glyceride and the dispersing agent coordinated on the surfaces thereof.

In the process for producing the dispersion solution containing the fine metal particles of the present invention, it is desired that:

1. The step of concentration is included for distilling off the solvent such that the concentration of the solvent becomes not more than 5% by weight after the step of extraction;
2. The step is included for diluting the dispersion solution containing the fine metal particles obtained through the step of concentration with a solvent of any type of water, hydrocarbons, ether, ester or glycol ether;
3. The fatty acid metal salt is a fatty acid salt of the metal of any one of Ag, Cu or Zn; and
4. In the step of preparing the glycerin in which the fine metal particles are dispersed, a saccharin is added together with the fatty acid metal salt to the glycerin.

Effects of the Invention

With a specific dispersing agent being coordinated thereon, the fine metal particles of the present invention can be homogeneously dispersed in various diluting agents without being aggregated or precipitated, and become capable of imparting excellent antibacterial power to various kinds of dispersion solutions.

Moreover, the dispersion solution containing the fine metal particles of the present invention permits the fine metal particles on which a specific dispersing agent is coordinated to remain in a dispersed state maintaining stability over extended periods of time and, further, permits the solvent of either the water type or the organic solvent type to be used as a dispersion medium lending, therefore, the dispersion solution itself to be suited for use in a variety of applications. Furthermore, the dispersion solution containing the fine metal particles of the present invention is capable of efficiently eluting out metal ions that express antibacterial power and, therefore, is capable of expressing excellent antibacterial power.

Moreover, according to the process for producing the dispersion solution containing the fine metal particles of the present invention, it is allowed to extract the fine metal particles into the dispersion solution in good yields through a simple operation, and a dispersion solution containing the fine metal particles at a high concentration can be economically produced. Upon concentrating the obtained dispersion solution, furthermore, it becomes possible to disperse the fine metal particles again in various diluting solvents of the water type or the organic solvent type other than the extraction solvent that is capable of forming two separate phases with the glycerin.

BRIEF DESCRIPTION OF THE DRAWING

FIG. 1. It is a drawing schematically illustrating a dispersing agent on fine metal particles using a solvent.

MODES FOR CARRYING OUT THE INVENTION (Fine Metal Particles and Dispersion Solution Containing the Fine Metal Particles)

The fine metal particles of the present invention has an important feature in that a dispersing agent is coordinated on the surfaces of the fine metal particles which are of any one of Ag, Cu or Zn, the dispersing agent having an acid value and an amine value which are both in a range of 0 to 20 mgKOH/g (wherein when either the acid value or the amine value is 0, the other one is not 0).

According to the prior arts of the present inventors described above, the fine metal particles having the fatty acid and the glyceride coordinated on the surfaces thereof can be formed by heating and mixing the fatty acid metal salt in the glycerin. In these fine metal particles, however, the low polar chains receive only a weak steric hindrance from the fatty acid groups. Therefore, the fine metal particles are not satisfactory in regard to dispersion property and stability with the passage of time. Moreover, the fine metal particles have a low zeta potential as found from the electrophoretic mobility based on the dynamic light scattering method. The fine metal particles of the present invention, further, use a specific dispersing agent. Namely, the dispersing agent having an acid value in a range of 0 to 20 mgKOH/g and an amine value in a range of 0 to 20 mgKOH/g (wherein when either the acid value or the amine value is 0, the other one is not 0) is coordinated on the fatty acid and on the glyceride. The specific dispersing agent coordinated on the surfaces of the fine metal particles has not less than one low polar chain and not less than one polar chain. In a nonpolar solvent, therefore, the low polar chains of the dispersing agent are oriented toward the dispersion medium contributing to improving the wettability between the nonpolar solvent and the fine metal particles while suppressing the fine metal particles from being aggregated by the steric hindrance among the low polar chains. In a polar solvent as represented by water, on the other hand, the polar chains of the dispersing agent work to suppress the aggregation owing to the electric repulsion in the interfacial electric double layer.

In the fine metal particles of the present invention, the specific dispersing agent is coordinated on the surfaces thereof. In the nonpolar solvent, therefore, the zeta potential found from the electrophoretic mobility based on the dynamic light scattering method assumes a positive electric charge since the low polar chains are oriented toward the dispersion medium. In the polar solvent, on the other hand, the zeta potential assumes a negative electric charge since the polar chains of the dispersing agent are oriented toward the dispersion medium. Accordingly, the fine metal particles can be dispersed again not only in the ketone type solvents but also in various kinds of diluting solvents without being aggregated.

In the fine metal particles of the present invention, furthermore, the fatty acid and the glyceride, too, are coordinated on the surfaces thereof. Therefore, the fine metal particles can be homogeneously dispersed in the solvent being aided by the presence of the dispersing agent without, however, being aggregated. Even after the passage of a predetermined period of time, therefore, the fine metal particles remain dispersed maintaining excellent stability without being precipitated.

The dispersion solution containing the fine metal particles of the present invention has an important feature in that in a solvent, there are dispersed fine metal particles of any one of Ag, Cu or Zn having a dispersing agent coordinated on the surfaces thereof, the dispersing agent having an acid and an amine value which are both in a range of 0 to 20 mgKOH/g (wherein when either the acid value or the amine value is 0, the other one is not 0).

The dispersion solution containing the fine metal particles of the present invention includes;

a dispersion solution in which the fine metal particles are dispersed in a solvent (hereinafter often referred to simply as "extraction solvent") that is capable of forming two separate phases with the glycerin as obtained by a process of producing the dispersion solution containing the fine metal particles described later, and a dispersion solution obtained by dispersing again, in a solvent other than the extraction solvent, a paste-like dispersion solution that contains, at a high concentration, the fine metal particles as obtained by concentrating the above dispersion solution.

As described above, the fine metal particles of the present invention have the specific dispersing agent coordinated thereon and, therefore, can be homogeneously dispersed again in various kinds of solvents without being aggregated. Besides, the fine metal particles of the invention has excellent stability with the passage of time, i.e., can remain dispersed maintaining stability over extended periods of time yet maintaining excellent transparency. Moreover, the dispersion solution containing the fine metal particles of the present invention permits metal ions which are antibacterial components to be eluted out very excellently and, therefore, exhibits excellent antibacterial power. In the specification, the word "antibacterial" stands for suppressing the multiplication or propagation of bacteria.

In the dispersion solution containing the fine metal particles of the present invention, furthermore, the fine metal particles having excellent antibacterial power have been homogeneously dispersed in the solvent. By using the dispersion solution as a solvent for diluting the coating composition or the resin composition, therefore, it is made possible to impart excellent antibacterial power to the films and the formed articles of resins.

The fine metal particles of the present invention have a mean primary particle size of not more than 100 nm and a mean secondary particle size of not more than 900 nm as will be described later. Even when mixed into the coating composition or the resin composition, therefore, the fine metal particles of the invention do not cause a drop in the transparency of the composition itself.

In the dispersion solution containing the fine metal particles of the invention, further, the fine metal particles present in the dispersion solution have a fatty acid that is coordinated on the surfaces thereof, have a glyceride coordinated around the fatty acid or on the surfaces thereof, and have a dispersing agent having specific acid value and amine value coordinated thereon. Therefore, the fine metal particles of the invention have very excellent dispersion stability, do not almost precipitate even after the passage of long periods of time, and can be favorably and homogeneously dispersed when used for a resin composition layer that constitutes a transparent material. In the dispersion solution, further, the fine metal particles have the glyceride as well as the dispersing agent coordinated around the fatty acid or on the surfaces thereof. When used in the resin composition layer, therefore, the surfaces of the fine metal particles come less into direct contact with the resin, effectively suppressing the resin from being decomposed, preventing a decrease in the molecular weight of the resin and effectively preventing the hindrance upon the formability and the workability.

As the method of producing the fine metal particles of the present invention, there can be exemplified a vapor phase method of granulating, based on the reaction, coagulation or crystallization, the starting material which is in the state of a gas phase due to the gasification or the like (electric furnace method, laser method, thermal plasma method); a liquid-phase method of granulating, based on the reaction or dispersion solidification, the starting material which is in a liquid state due to being dissolved (sol-gel method, reduction method); and a solid layer method of granulating the starting material in the state of a solid layer by forming nuclei by the reaction or by the pulverization.

[Antibacterial Components]

In the fine metal particles of the present invention, the metal species that could serve as an antibacterial component is any one of Ag (silver), Cu (cupper) or Zn (zinc). By using a salt of a fatty acid metal that is one of the above metal species, the fatty acid is coordinated on the surfaces of the fine metal particles.

As the fatty acid that forms the fatty acid metal salt, there can be exemplified myristic acid, stearic acid, oleic acid, palmitic acid, n-decanoic acid, paratoluic acid, succinic acid, malonic acid, tartaric acid, malic acid, glutaric acid, adipic acid and acetic acid. Among them, the stearic acid can be favorably used. Further, as the metal component, silver is particularly preferred.

[Particle Size of the Fine Metal Particles]

It is desired that the fine metal particles of the present invention has a mean primary particle size of not more than 100 nm, specifically, in a range of 10 to 50 nm and has a mean secondary particle size of not more than 900 nm and, specifically, in a range of 200 to 700 nm.

In the specification, a single metal particle is the one that has no gap between the metal particles, and the average primary particle size is an average size of such single metal particles. Further, the mean secondary particle size is an average size of the metal particles that are in a state of being packed together.

[Dispersing Agents]

As the dispersing agent that is coordinated on the fine metal particles of the invention and has an acid value and an amine value which are both in a range of 0 to 20 mgKOH/g (wherein when either the acid value or the amine value is 0, the other value is not 0), there is preferably used a wet dispersing agent of a star polymer structure having, in a monomeric unit, at least either one or preferably both of an acid functional group such as carboxylic acid, acid anhydride group, sulfonic acid group or phosphoric acid group and a basic functional group such as amino group, imino group, ammonium salt group or heterocyclic group having a basic nitrogen atom. Specifically, it is desired to use a dispersing agent having an acid value in a range of 5 to 20 mgKOH/g, preferably, 11 to 20 mgKOH/g and, more preferably, 15 to 20 mgKOH/g, and an amine value in a range of 10 to 20 mgKOH/g and, preferably, 15 to 20 mgKOH/g.

The wet dispersing agent used in the invention is a dispersing agent having a weight average molecular weight of not less than 1,000. When the wet dispersing agent has the weight average molecular weight which is not more than 1,000, the steric hindrance is not sufficiently received from the acid functional group and/or the basic functional group. There is no specific limitation on the resin skeleton to which these functional groups are bonded, and there can be used a styrene-maleic acid copolymer, a polyurethane resin, a polyester resin or an acrylic resin.

As the acid functional group and/or the basic functional group of the dispersing agent are firmly adsorbed by the fine metal particles, a polarity is imparted t the fine metal particles whereby the fine metal particles undergo repulsion due to the electric charge. Moreover, a steric hindrance is formed by the presence of modifying groups of certain lengths on the surfaces of the fine metal particles. As a result, it is considered that the fine metal particles are allowed to be homogeneously dispersed in the solvent without being aggregated or precipitated therein.

As the dispersing agent that can be favorably used in the dispersion solution containing the fine metal particles of the present invention, there can be exemplified the Disperbyk 2091 (produced by BYK Chemie Co.) though not limited thereto only.

[Solvents]

When the dispersion solution containing the fine metal particles of the present invention is directly prepared by the process for producing the dispersion solution containing the fine metal particles of the present invention, the solvent in which the fine metal particles are to be dispersed can be capable of forming two separate phases with the glycerin, as the solvent, there can be exemplified a ketone type solvent such as methyl isobutyl ketone or methyl ethyl ketone; a hydrocarbon type solvent such as hexane or heptane; cyclo ring type solvent such as cyclohexane or cyclohexanone; or aromatic solvents such as benzene, toluene and xylene.

Further, the dispersion solution containing the fine metal particles of the invention may be a dispersion solution that is obtained by diluting, with a solvent other than the extraction solvent, the paste-like dispersion solution that is obtained by so concentrating the dispersion solution prepared by the above-mentioned production process that the concentration of the extraction solvent is not more than 5% by weight. In this case, the fine metal particles can be dispersed in a variety of kinds of solvents.

As the solvent, there can be exemplified, in addition to the above-mentioned solvents, the ester type solvents such as butyl acetate; ether type solvents such as diethyl ether; glycol ether type solvents such as propylene glycol monomethyl ether acetate; alcohol type solvents having not less than three carbon atoms, such as isopropyl alcohol; as well as styrene, methyl methacrylate and various kinds of water such as distilled water, ion-exchanged water and pure water.

The dispersion solution of the present invention does not permit the fine metal particles to be aggregated or precipitated even when the fine metal particles are contained at various concentrations in the above-mentioned various solvents; i.e., the fine metal particles remain homogeneously dispersed over extended periods of time. From the standpoint of balance between the antibacterial power and the dispersion property, however, it is desired that the fine metal particles are contained in an amount of not more than 10% by weight.

(Process for Producing the Dispersion Solution Containing the Fine Metal Particles)

It is important that the process for producing the dispersion solution containing the fine metal particles of the invention comprises the steps of:

preparing a glycerin in which the fine metal particles are dispersed, the fine metal particles having a fatty acid and a glyceride coordinated on the surfaces thereof, by adding a fatty acid metal salt to the glycerin followed by heating and mixing (hereinafter "step (A)");

preparing a mixed solution containing the fine metal particles having the fatty acid, the glyceride and a dispersing agent coordinated on the surfaces thereof, by adding and mixing, into the glycerin prepared in the step (A) above and in which the fine metal particles are dispersed, the dispersing agent and an extraction solvent that is capable of forming two separate phases with the glycerin, the dispersing agent having an acid value and an amine value which are in a range of 0 to 20 mgKOH/g (hereinafter "step (B)"); and extracting the fine metal particles having the fatty acid, glyceride and dispersing agent coordinated on the surfaces thereof from the glycerin into the extraction solvent by separating the mixed solution prepared in the step (B) above into two phases (hereinafter "step (C)").

[Step (A)]

In the step (A), there are formed, in the glycerin, the fine metal particles having the fatty acid and glycerin coordinated on the surfaces thereof. There is no specific limitation on the heating condition in the step (A) so far as there can be formed the fine metal particles on which the fatty acid and glyceride are coordinated. The fatty acid metal salt is added to the glycerin which is then heated at a temperature in a range of 120 to 230° C. and, specifically, 140 to 170° C. Through the heating and mixing for 10 to 120 minutes and, specifically, 30 to 80 minutes, though dependent upon the temperature of heating, there can be formed, in the glycerin, the fine metal particles having the fatty acid and glyceride coordinated on the surfaces thereof. Namely, upon being heated in the above-mentioned temperature range, the fatty acid metal salt is decomposed and reduced into the fatty acid and the metal, i.e., the fine metal particles with the fatty acid being coordinated on the surfaces thereof. The glyceride is formed as the fatty acid and the glycerin undergo the esterification reaction and, at the same time, the glyceride is coordinated like the fatty acid on the surfaces of the fine metal particles. Namely, in the glycerin are dispersed the fine metal particles on which the fatty acid and glyceride are coordinated.

It is here desired that the fatty acid metal salt which is the antibacterial component is added in an amount of 0.1 to 30 parts by weight per 100 parts by weight of the glycerin. More preferably, it is added in an amount of 0.1 to 10 parts by weight per 100 parts by weight of the glycerin. If the fatty acid metal salt is added in an amount smaller than the above range, the antibacterial power cannot be imparted to the dispersion solution to a sufficient degree. If the fatty acid metal salt is added in an amount larger than the above range, on the other hand, the antibacterial effect can be improved accompanied, however, by disadvantage in economy and formability.

In the invention, further, it is desired to add a saccharine together with the fatty acid metal salt from the standpoint of efficiently forming the fine metal particles on which the fatty acid and the glyceride are coordinated. The saccharine is added in an amount of, desirably, 0.01 to 1 part by weight per 100 parts by weight of the glycerin.

[Step (B)]

Next, to the glycerin containing the fine metal particles prepared in the step (A), there are added the extraction solvent and the dispersing agent having an acid value in a range of 0 to 20 mgKOH/g and an amine value in a range of 0 to 20 mgKOH/g (wherein when either the acid value or the amine value is 0, the other one is not 0), followed by stirring and mixing. There is thus prepared a mixed solution containing the fine metal particles having the fatty acid, glyceride and dispersing agent coordinated on the surfaces thereof.

The dispersing agent is added in an amount of, desirably, 0.1 to 5 parts by weight per 100 parts by weight of the fatty acid metal salt. If the dispersing agent is added in an amount smaller than the above range, the fine metal particles are dispersed less than when the amount of the dispersing agent is in the above range. In this case, the fine metal particles could be dispersed again but poorly in a solvent other than the extraction solvent. On the other hand, despite the amount of the dispersing agent is larger than the above range, no further improved effect can be expected but only inviting disadvantage in economy.

As the extraction solvent capable of forming two separate phases with the glycerin, there can be exemplified the above-mentioned ketone type solvents such as methyl isobutyl ketone and methyl ethyl ketone; hydrocarbon type solvents such as hexane and heptane; cyclo ring type solvents such as cyclohexane and cyclohexanone; and aromatic solvents such as benzene, toluene and xylene. In the invention, specifically, in order to efficiently extract the fine metal particles in the glycerin at the time of separation into two phases, it is desired to select a solvent having a high degree of solubility with the fatty acid or the glyceride. For this purpose, it is desired to select a solvent having such an SP-value (solubility parameter) that makes a difference (absolute value) of no more than 3 from the SP-value of the fatty acid or the glyceride coordinated on the surfaces of the metal particles. As the above extraction solvent, toluene can be exemplified.

The extraction solvent that is capable of forming two separate phases with the glycerin is added in an amount desirably in a range of 10 to 200 parts by weight per 100 parts by weight of the glycerin. By varying the amount of the extraction solvent that is added, furthermore, it becomes possible to vary the concentration of the metal in the extraction solvent.

Moreover, in preparing the mixed solution, it is allowable to add a high-boiling solvent such as ethylene glycol as an extraction assistant together with the extraction solvent. The high-boiling solvent is added in an amount, desirably, in a range of 10 to 200 and, specifically, 50 to 100 parts by weight per 100 parts by weight of the extraction solvent.

[Step (C)]

Upon separating the mixed solution of the glycerin and extraction solvent prepared in the step (B) into two phases, the fine metal particles can be extracted from the glycerin into the extraction solvent, the fine metal particles having the fatty acid, glyceride and dispersing agent coordinated on the surfaces thereof.

Upon being left to stand still at a temperature of 0 to 40° C. for not less than 60 minutes and, preferably, for one day to one week, the mixed solution is separated into two phases of the glycerin and the extraction solvent. The fine metal particles present in the glycerin are then extracted by the extraction solvent, the fine metal particles having the fatty acid and glyceride coordinated on the surfaces thereof and, further, having, coordinated on the surfaces thereof, the dispersing agent that has a specific acid value and amine value. In the glycerin, there remain the unreacted fatty acid metal salt and the aggregate of only the metal as a result of over-reduction. By removing the glycerin, therefore, there can be obtained the dispersion solution comprising the extraction solvent in which the fine metal particles only are dispersed.

The glycerin can be removed by a known method such as simple distillation, reduced pressure distillation, precision distillation, thin film distillation, extraction or membrane separation. More preferably, however, the glycerin can be removed by the decantation.

[Step (D)]

The present invention is capable of providing not only the dispersion solution containing the fine metal particles comprising the extraction solvent in which the fine metal particles are homogeneously dispersed as obtained through the process that includes the above-mentioned steps (A) to (C) but also the dispersion solutions obtained by homogeneously dispersing the fine metal particles in various kinds of solvents other than the extraction solvent.

That is, the dispersion solution containing the fine metal particles obtained by homogeneously dispersing the fine metal particles in the extraction solvent through the above-mentioned steps (A) to (C), is concentrated by so distilling off the extraction solvent that the concentration of the extraction solvent is not more than 5% by weight.

As for the method of concentration, there can be exemplified such known methods as a method of volatilizing the extraction solvent by heating the extraction solvent at a temperature higher than a volatilization temperature thereof, a method of subjecting the dispersion solution to the precipitation treatment by using a centrifuge and separating the extraction solvent by decantation, and a membrane separation.

The dispersion solution containing the fine metal particles and, further, containing the extraction solvent at a concentration of not more than 5% by weight, can be diluted with not only the extraction solvent but also with any other solvent mentioned earlier, i.e., with the solvent of any type of water, hydrocarbons, ether, ester or glycol ether so as to assume any concentration. The dispersion solution containing the fine metal particles can then be used as a solvent for diluting various kinds of the coating compositions or the resin compositions.
(Use of the Dispersion Solution Containing the Fine Metal Particles)

The dispersion solution containing the fine metal particles of the present invention can be favorably used as a solvent for diluting the coating composition or the resin composition. Without impairing the transparency of the coating composition or the resin composition, therefore, there can be formed a film comprising the coating composition or a resin formed article comprising the resin composition.

As the coating composition, there can be exemplified those compositions that use, as the base resin, a thermosetting resin such as phenol resin, epoxy resin, urethane resin, melamine resin, urea resin, alkyd resin, unsaturated polyester resin or silicon resin, or a photo-curable acrylic resin.

As the resin composition, further, there can be exemplified those comprising olefin resins such as low-, intermediate-, or high-density polyethylene, linear low-density polyethylene, linear very-low-density polyethylene, isotactic polypropylene, syndiotactic polypropylene, propylene-ethylene copolymer, polybutene-1, ethylene-butene-1 copolymer, propylene-butene-1 copolymer, and ethylene-propylene-butene-1 copolymer; polyester resins such as polyethylene terephthalate, polybutylene terephthalate and polyethylene naphthalate; polyamide resins such as nylon 6, nylon 6,6, and nylon 6,10; and polycarbonate resins in addition to those comprising the above-mentioned thermosetting resins.

The dispersion solution containing the fine metal particles of the present invention excels in transparency and can, therefore, be used, specifically, as a solvent for diluting the acrylic resins that require a high degree of transparency and, particularly, the composition comprising the photo-curable acrylic resin.

EXAMPLES

The present invention will now be described in further detail based on Examples to which only, however, the invention is in no way limited.
(Measuring the Silver Concentration)

Silver concentrations were measured as shown in Tables 1 and 2. Five ml of pure water and 5 ml of nitric acid were added to 2.0 g of the dispersion solution. Thereafter, pure water was further added thereto such that the amount of the solution was 250 ml in a graduated cylinder. The solution was measured for its silver concentration by using an inductively coupled plasma emission analyzer. When the silver precipitated and could not be maintained dispersed in the M1BK, it was described as "not measurable" in Tables.
(Measuring the Maximum Absorption Wavelength and Absorbency)

Maximum absorption wavelengths and absorbencies were measured as shown in Table 2. Each dispersion solution containing the fine metal particles contained silver at a unified concentration of 0.01 wt %. Maximum absorption wavelengths near 400 nm and absorbencies abs were evaluated by using the ultraviolet visible spectrophotometer (V-570 manufactured by JASCO Corporation). The absorbency abs was evaluated to be A when it was not less than 2, B when it was less than 2 but was not less than 1, and C when it was less than 1. When nanoparticles of silver were present, a sharp absorption was recognized near a wavelength of 400 nm due to the plasmon on the surfaces of the silver nanoparticles.
(Measuring the Zeta Potential)

Zeta potentials were measured as shown in Table 3. By using the zeta potential particle size system (ELSZ-1000ZS manufactured by Otsuka Electronics Co., Ltd.), zeta potentials on the fine metal particles were evaluated.

Examples 1 to 3

5.56 Grams of a silver stearate and 0.56 g of a saccharine were added to 1000 g of a glycerin, and the mixture was heated and stirred at 150 rpm at a temperature of 150° C. for 15 minutes and was then cooled down to 80° C. To 1 kg of the methyl isobutyl ketone, there were added the dispersing agents shown in Table 1 having an acid value in a range of 0 to 20 mgKOH/g and an amine value in a range of 0 to 20 mgKOH/g each in an amount of 50 g, and the mixtures thereof were slowly added to the above glycerin with stirring. After left to stand still for 24 hours, the methyl isobutyl ketone layer was picked up to obtain dispersion solutions containing silver particles.

Comparative Example 1

A dispersion solution was prepared in the same manner as in Example 1 but adding no dispersing agent to the extraction solvent or the methyl isobutyl ketone used in Example 1.

Comparative Examples 2 to 10

Dispersion solutions were prepared in the same manner as in Example 1 but adding a dispersing agent having an acid value lager than 20 mgKOH/g and/or having an amine value lager than 20 mgKOH/g to the extraction solvent or the methyl isobutyl ketone used in Example 1.

TABLE 1

| | Dispersing agent | Acid value (mgKOH/g) | Amine value (mgKOH/g) | Silver concentration (wt %) |
|---|---|---|---|---|
| Example 1 | DISPERBYK-190 | 10 | 0 | 0.021 |
| Example 2 | DISPERBYK-2091 | 15 | 0 | 0.345 |
| Example 3 | DISPERBYK-2013 | 8 | 18 | 0.061 |
| Comp. Ex. 1 | not added | — | — | 0.048 |
| Comp. Ex. 2 | DISPERBYK-2055 | 0 | 48 | not measurable |
| Comp. Ex. 3 | DISPERBYK-181 | 30 | 0 | not measurable |
| Comp. Ex. 4 | DISPERBYK-118 | 36 | 0 | not measurable |
| Comp. Ex. 5 | DISPERBYK-2095 | 36 | 0 | not measurable |
| Comp. Ex. 6 | DISPERBYK-2090 | 61 | 0 | not measurable |
| Comp. Ex. 7 | DISPERBYK-194 | 70 | 0 | not measurable |
| Comp. Ex. 8 | DISPERBYK-187 | 35 | 35 | not measurable |
| Comp. Ex. 9 | DISPERBYK-140 | 73 | 76 | not measurable |
| Comp. Ex. 10 | DISPERBYK-180 | 94 | 94 | not measurable |

Example 4

A concentrated solution was prepared by concentrating the dispersion solution of Example 2 by using an evaporator (NVC-2100) manufactured by EYELA Co. under 40 hPa and 50° C. The dispersion solvent that remained after the concentration had been reduced down to not more than 10% by mass. The concentrated solution, too, exhibited a maximum absorption wavelength near the wavelength of 400 nm, and the surface plasmon due to the silver nanoparticles was confirmed.

Example 5

1000 Milliliters of toluene was added dropwise to the concentrated solution of Example 4, and the mixture thereof was stirred at 300 rpm for 10 minutes to obtain a dispersion solution in which the silver particles had been dispersed in toluene.

Examples 6 and 7

Dispersion solutions were prepared in the same manner as in Example 5 but changing the amount of toluene used in Example 5 as shown in Table 2.

Examples 8 to 12

Dispersion solutions were prepared in the same manner as in Example 5 but changing the solvent (toluene) used in Example 5 into the solvents as described in Table 2.

TABLE 2

|  | Solvent species | Amount of solvent | Max. absorption wave length | Absorbency | Silver concentration (wt %) |
|---|---|---|---|---|---|
| Example 5 | toluene | 1000 ml | 410 nm | A | 0.332 |
| Example 6 | toluene | 500 ml | 410 nm | A | 0.601 |
| Example 7 | toluene | 250 ml | 410 nm | A | 1.230 |
| Example 8 | water | 1000 ml | 416 nm | B | 0.325 |
| Example 9 | 2-propanol | 1000 ml | 412 nm | B | 0.311 |
| Example 10 | Propylene glycol monomethyl ether | 1000 ml | 406 nm | A | 0.298 |
| Example 11 | butyl acetate | 1000 ml | 414 nm | A | 0.314 |
| Example 12 | hexane | 1000 ml | 414 nm | B | 0.341 |

It was learned from Table 2 that the concentrated solution of Example 4 exhibited the same maximum absorption wavelength and the absorbency even when it was dispersed in solvents having different SP-values. Furthermore, despite the amount of the solvent was varied, the maximum absorption wavelength and the absorbency remained the same but the silver concentration rose. It was, therefore, learned that the silver particles were maintained dispersed irrespective of the concentration thereof.

Examples 2, 5 and 8 were evaluated for their zeta potentials. As is obvious from Table 3, it was learned that the low polar chains and the polar chains of the dispersing agent coordinated on the surfaces of the fine metal particles could be varied depending on the solvent species and, therefore, the fine metal particles could be suppressed from being aggregated.

TABLE 3

|  | Solvent species | Zeta potential (mV) |
|---|---|---|
| Example 2 | methyl isobutyl ketone | +65.6 |
| Example 5 | toluene | +35.4 |
| Example 8 | water | −26.9 |

The invention claimed is:

1. A process for producing a dispersion solution containing fine metal particles, comprising the steps of:
    preparing a glycerin in which the fine metal particles are dispersed, the fine metal particles having a fatty acid and a glyceride coordinated on the surfaces thereof, by adding a fatty acid metal salt of the metal of any one of Ag, Cu or Zn to the glycerin followed by heating and mixing;
    preparing a mixed solution containing the fine metal particles having the fatty acid, the glyceride and a dispersing agent coordinated on the surfaces thereof, by adding and mixing, into the glycerin in which the fine metal particles are dispersed, the dispersing agent and a solvent that is capable of forming two separate phases with the glycerin, the dispersing agent having an acid value in a range of 15 to 20 mgKOH/g or an acid value in a range of 0 to 20 mgKOH/g and a amine value that is larger than 0 and not larger than 20 mgKOH/g, and the dispersing agent having not less than one low polar chain and not less than one polar chain; and
    extracting the fine metal particles from the glycerin into the solvent by separating the mixed solution into two phases, the fine metal particles having the fatty acid, the glyceride and the dispersing agent coordinated on the surfaces thereof; and
    the process further comprising the step of concentration for distilling off the solvent such that the concentration of the solvent becomes not more than 5% by weight after the step of extraction, wherein
    the dispersion solution containing the fine metal particles obtained through the step of concentration is diluted with a cyclo ring type solvent, an aromatic solvent or a solvent of any type of water, butyl acetate, styrene or methyl methacrylate so that the concentration of fine metal particles is in a range of 0.298% to 1.23% by weight.

2. The process for producing a dispersion solution containing fine metal particles according to claim 1, wherein a saccharin is added together with the fatty acid metal salt to the glycerin in the step of preparing the glycerin in which the fine metal particles are dispersed.

3. The process for producing a dispersion solution containing fine metal particles according to claim 1, wherein the dispersing agent has an acid value in a range of 5 to 20 mgKOH/g and an amine value in a range of 10 to 20 mgKOH/g.

4. The process for producing a dispersion solution containing fine metal particles according to claim 1, wherein the dispersing agent is added in an amount of 0.1 to 5 parts by weight per 100 parts by weight of a fatty acid metal salt.

5. The process for producing a dispersion solution containing fine metal particles according to claim 1, wherein the fine metal particles have a mean primary particle size of not more than 100 nm and a mean secondary particle size of not more than 900 nm.

* * * * *